July 5, 1927.

A. N. LUCIAN

STABILIZER

Filed March 1, 1923 — 5 Sheets-Sheet 1

1,634,950

Inventor
A. N. Lucian
By Attorney Robert H. Young

July 5, 1927.

A. N. LUCIAN 1,634,950

STABILIZER

Filed March 1, 1923

Inventor
A. N. Lucian

By Robert H. Young
Attorney

July 5, 1927.

A. N. LUCIAN 1,634,950

STABILIZER

Filed March 1, 1923

Inventor
A. N. Lucian
by Robert H. Young
Atty

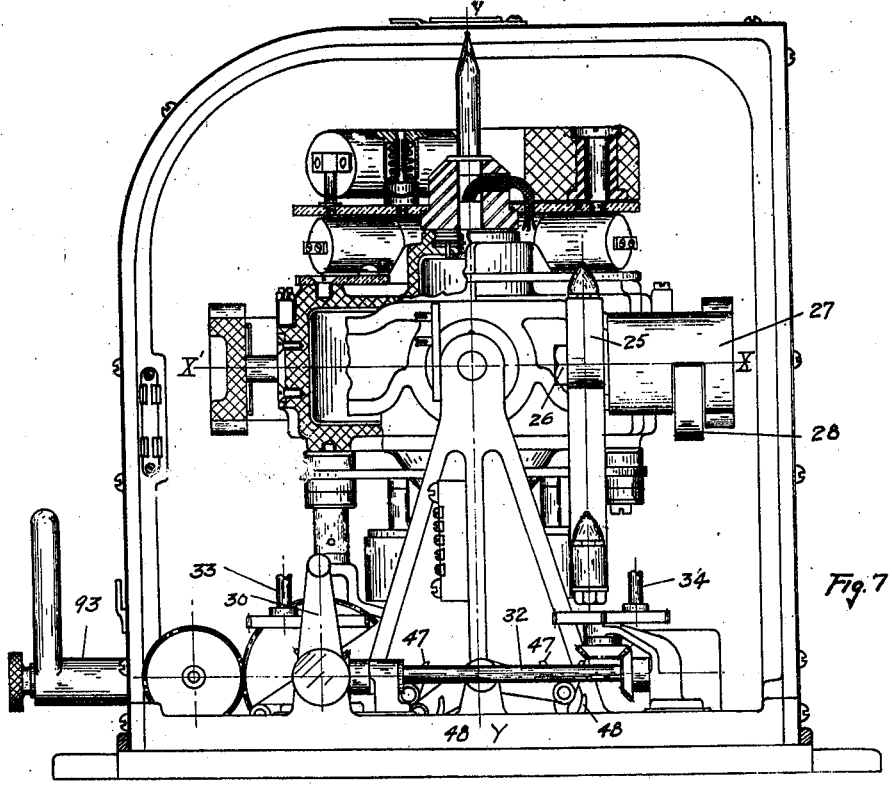

Patented July 5, 1927.

1,634,950

UNITED STATES PATENT OFFICE.

ARSENE N. LUCIAN, OF PHILADELPHIA, PENNSYLVANIA.

STABILIZER.

Application filed March 1, 1923. Serial No. 622,198.

The stabilization of various instruments and accessories used on land, marine and aerial vehicles is a problem of great importance as well as of great difficulty. The importance of the problem is especially enhanced in connection with instruments of precision which are used on board ships and aerial crafts, such for example, as observation telescopes, artificial horizon mirrors, bombsights, aerial cameras etc.

One of the objects of this invention is to provide a vertical indicating gyroscope which will furnish the stabilizing elements necessary for the purpose in view.

Another object of the invention is to devise various methods of connection between the gyro element and the instrument to be stabilized.

Another object of the invention is to apply the said methods of stablization to three specific instruments, which are used most commonly on balloons, airships and airplanes, namely observation instruments, bombsights and aerial cameras.

However, it is to be clearly understood that my novel methods of stabilization may be applied to any other instruments used on aerial craft or for any other purpose on air, sea or land vehicles.

The question of stabilizing any instrument may be solved in a number of different ways, depending upon the construction, operation and characteristic of the instrument considered, and upon the requirements imposed thereon. In general the systems of stabilization employed, especially in reference to the connection between the stabilizer and the object to be stabilized, may be classified into two main groups, namely, stabilization by direct linkage or connection with a stabilizer and stabilization by indirect or secondary means controlled or guided by a stabilizer. It is of course difficult to delimit these groups very sharply for it is possible to incorporate in one system desirable features of both direct and indirect stabilization.

Furthermore the merits and faults of each of these groups and their fields of application are well known to those versed in the art and hence need not be discussed here. It is only necessary to state that my invention contemplates the use of a vertical indicating gyroscope (covered by a copending application) for a stabilizer and in combination therewith either or both systems of stabilization mentioned above or their combinations.

I shall describe in detail the application of my system of stabilization only to a few especially, selected instruments, such as aerial cameras, bombsights and balloon sights; but I desire it to be clearly understood that my gyro stabilizer and the different methods of stabilization disclosed here are equally well applicable to other instruments or parts thereof and fall, therefore, within the limits of this invention.

In the accompanying drawings:

Fig. 7 is an end view of the same system.

Figure 1:
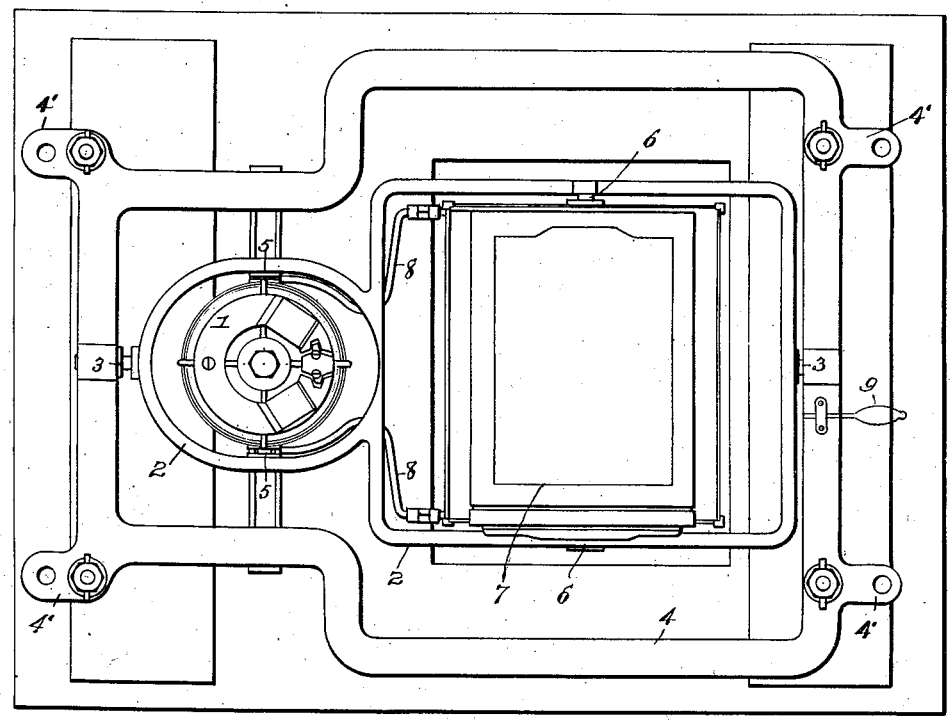
Fig. 1 is a plan view of a directly stabilized camera.
Figure 2:
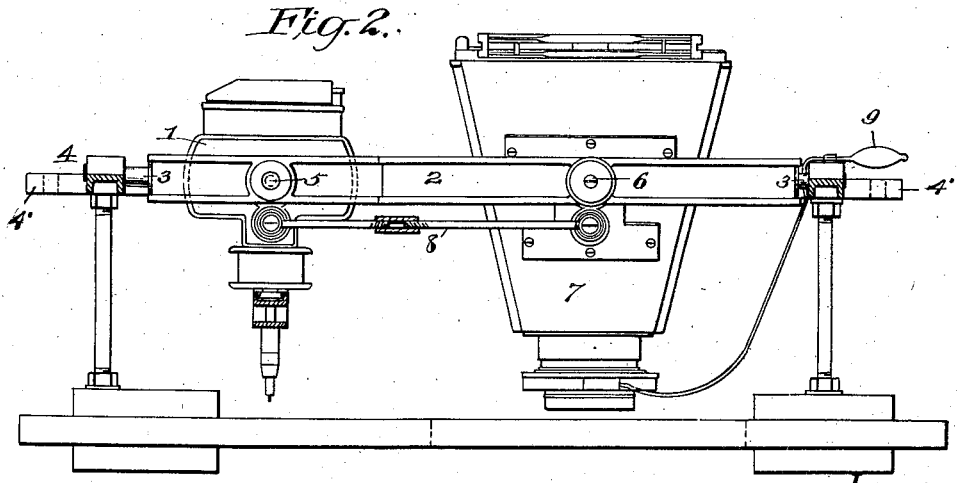
Fig. 2 is a side elevation of the same.
Figure 3:
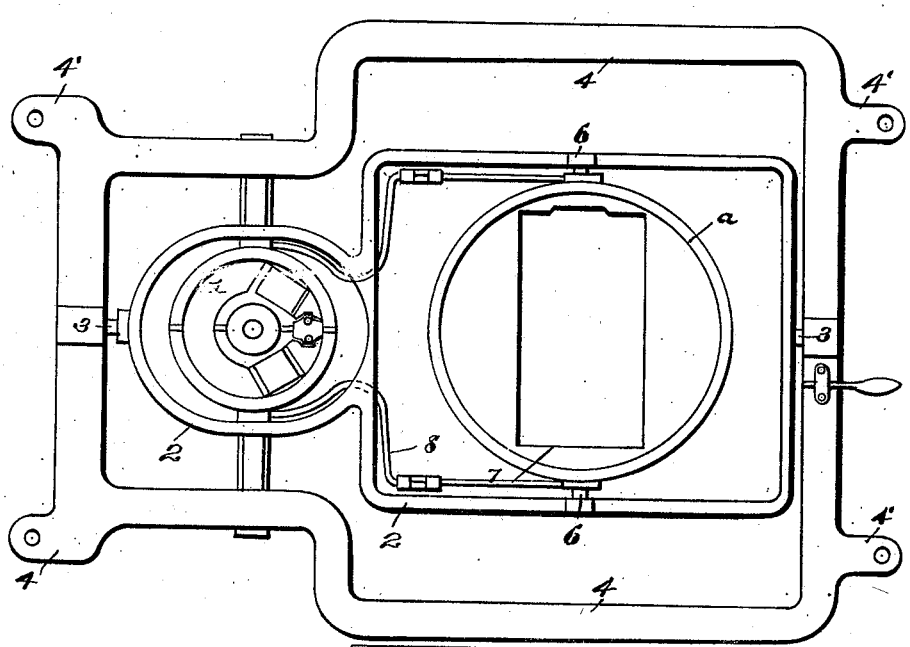
Fig. 3 is a plan view showing another camera mounting.
Figure 4:
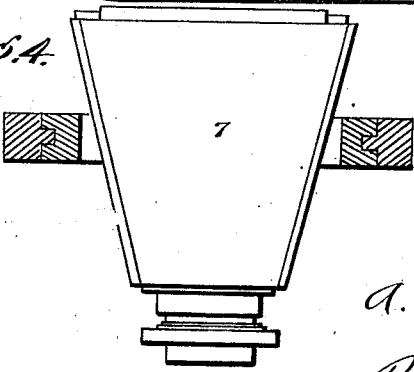
Fig. 4 is a vertical sectional view of the same.

In Figure 1, a gyroscope (1) preferably of the type described in my companion application, is mounted in the gimbal frame (2) in the usual manner, and this gimbal frame is in turn pivoted in trunnions (3) within an outer supporting frame (4), which may be shaped in any way to suit the space available and to accommodate the camera to be stabilized.

The gimbal ring (2) may also be constructed in any suitable shape, depending upon the shapes and sizes of the gyroscope and the camera used. In the particular embodiment shown here, the gimbal ring (2) is provided with two pairs of trunnions (5, 5) and (6, 6) in one pair of which is suspended the gyroscope (1) and in the other the camera (7).

In order to secure complete stabilization about both horizontal axes of suspension, one or more swiveled connecting rods (8) are provided; these rods are provided with ball bearing joints at each end and serve to connect the camera with the gyroscope, thereby insuring parallel movement of the two within the gimbal frame.

The connecting rods are also provided with extension joints of the usual type whereby their length may be changed and set at will; in this way I provide a simple means of setting the optical axes of the camera at any desired angle to the vertical and maintaining the same angle throughout an entire series of exposures. The angularity of the camera axes with respect to the vertical may be indicated and read on a graduated scale engraved on the rod against an index marked on the adjusting nut of the extension joint.

(9) represents the bulb used ordinarily to operate the shutter of the camera. The camera (7) shown in the accompanying drawings, is an ordinary plate camera, operated manually now especially designed for aerial photography; this particular type is shown here merely for purpose of illustration and it is to be understood that I am at liberty to use any style of camera whatsoever in the system or systems of stabilization disclosed in this application.

I desire to stabilize aerial cameras of different weight, design and features, and choose suitable gyroscope units possessing greater or smaller damping torques capable of handling the particular camera in view.

In case the camera to be stabilized is of the so-called automatic type which requires no manual control of any kind, a gyroscope with a relatively weak damping torque may be used to advantage since the camera is not subject to violent disturbances. In any case it must be clearly understood that I suspend both the gyroscope unit and the camera unit in approximately neutral equilibrium so that neither unit is subject to strong pendulous action due to acceleration pressures, and that the camera does not impose any appreciable load upon the gyroscope. This feature of balancing each unit of the system separately to a neutral equilibrium is an important and distinctive element of my invention and furthermore it is believed to be the only correct principle to rely upon in problems of stabilization.

Furthermore, when it is desired to give to the camera freedom of movement about its optical axes, I may provide another ring $a$ within the gimbal ring (2) to which I may fasten the camera in such a manner that the camera may be rotated within this inner ring about its optical axis and set or clamped in any position, so as to change the position of the image without changing the field in any way. In this case this inner ring will carry the trunnions (6, 6) which are shown by the body of the camera in the present drawings.

It is thus evident that the system is provided with means for turning the camera about its optical axis within the inner ring mentioned above as well as for tilting the optical axis of the camera to any angle with respect to the vertical by means of the adjustable connecting rods.

In the embodiment shown in the present drawings, the whole system including the gyro unit and the camera, is carried on a single outer frame (4) for reasons of convenience and compactness. It is obvious that this frame may be split up into as many parts as desired and such parts distributed in any convenient manner. It will be noted that the above mentioned frame (4) is anchored, by means of bolts, on a base.

It may often be more convenient in practice to discard the base entirely and suspend the frame from suitable rails or beams on the body of an air-craft through the mediums of elastic shock absorbing cushions. For such purposes the frame (4) is provided with four projections (4') suitable for holding shock absorbing cushions and clamping the frame (4) to any part of the craft desired.

Figure 5:
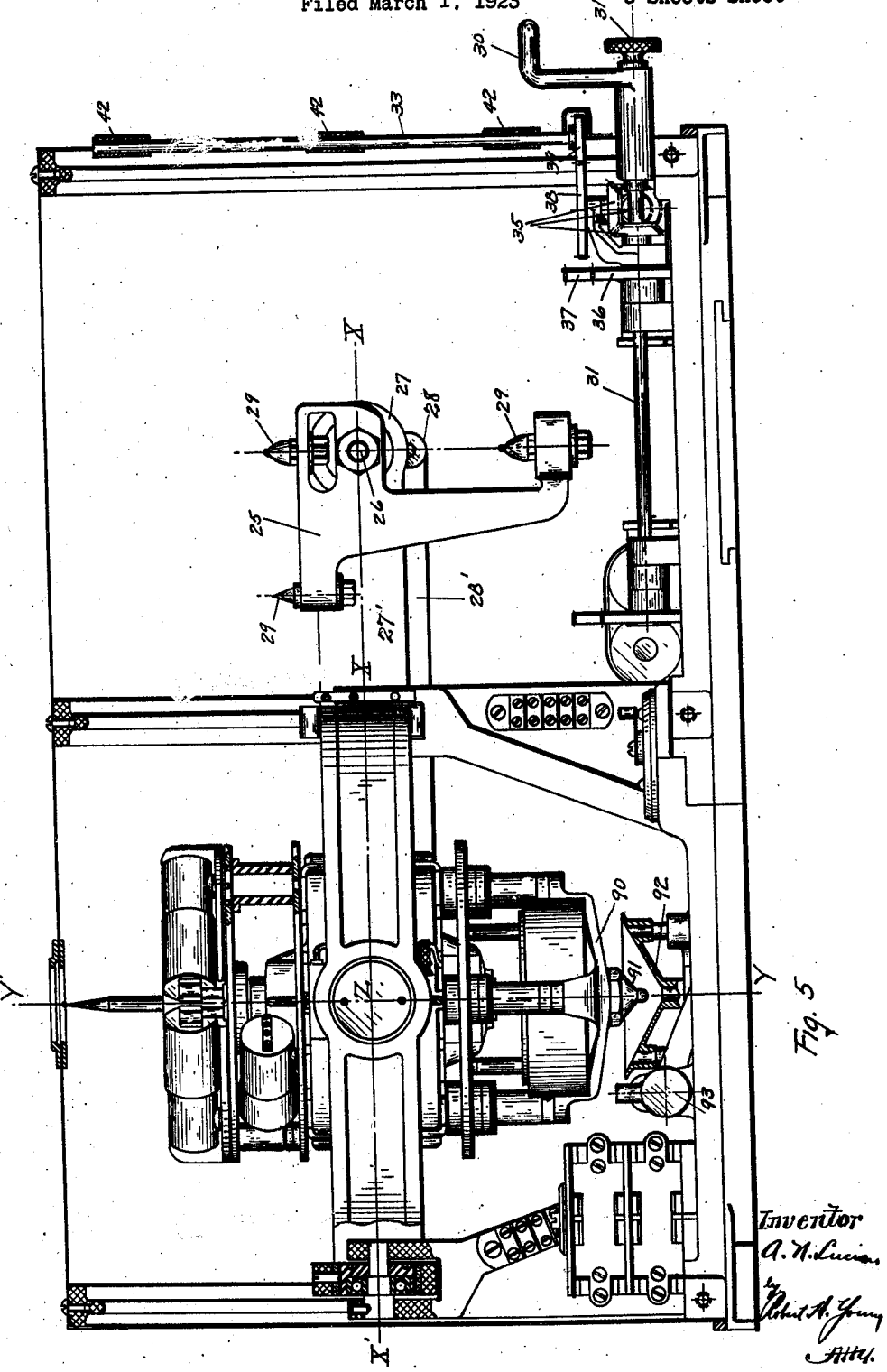
Fig. 5 is a front elevation of my bombsight stabilizer.
Figure 6:
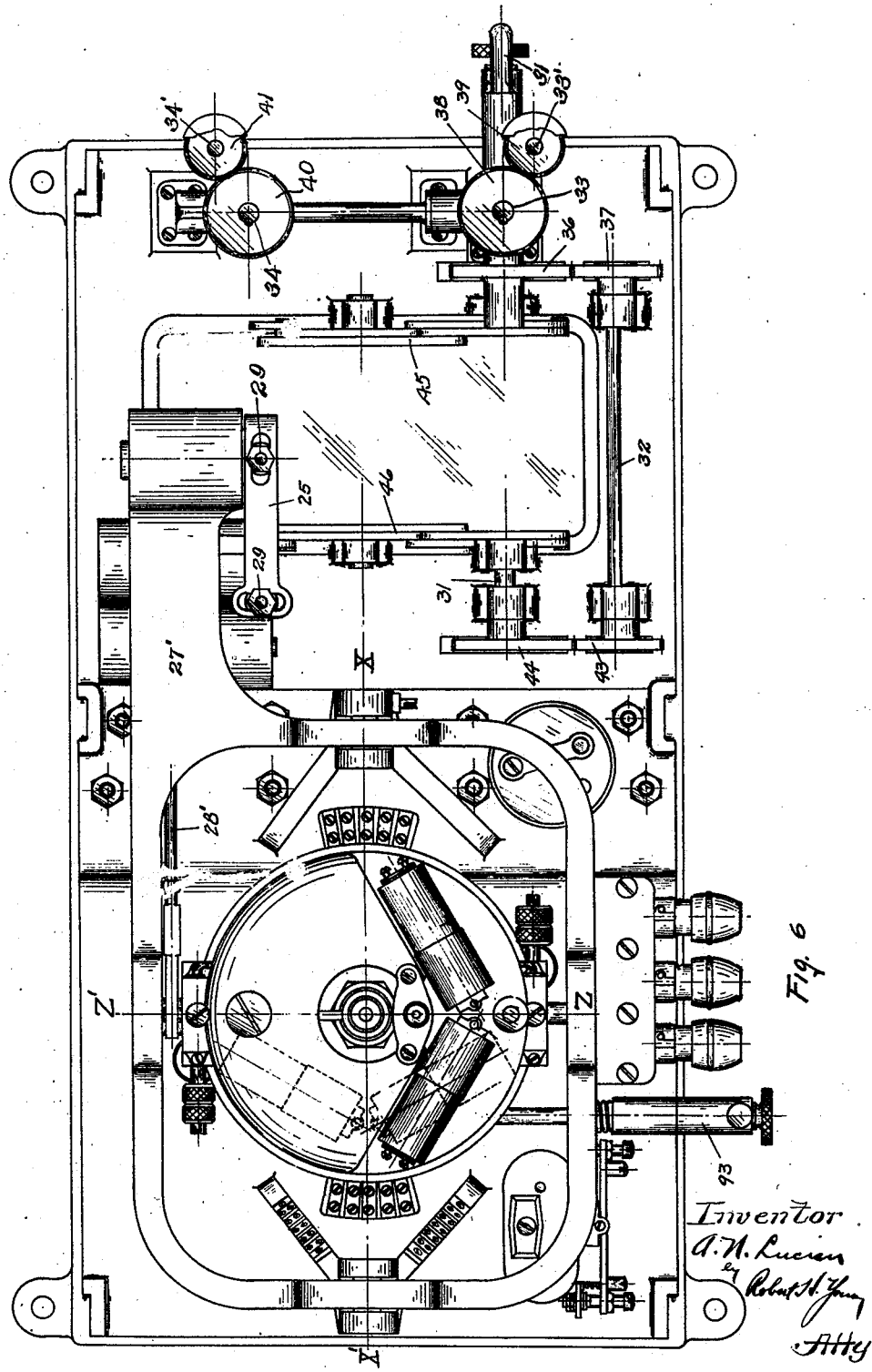
Fig. 6 is a plan view of the system of Figure 5.

Referring now to the stabilization of bombsights, as disclosed in Figures 5, 6 and 7, I may employ a direct and an indirect method of stabilization somewhat similar to those disclosed in connection with the stabilization of cameras. The mechanical features of such stabilization will be apparent as we proceed with the description of the accompanying drawings.

(25) is a frame or carrier of any suitable shape mounted rigidly upon a shaft or axle (26) which is placed parallel to the axis $Z, Z'$, of the gyro system and is free to rotate on ball bearings within the extension (27) of the gimbal frame (27') of the gyro. To this axle is also rigidly connected a small crank arm (28) to which is pivoted by a ball bearing joint, the connecting rod (28') the other end of which is pivoted by a ball bearing joint to the gyro casing. It will therefore be evident that the carrier (25) has two degrees of freedom about the horizontal axes $X, X'$ and $Z, Z'$ and upon this carrier may be placed the bombsight or any other instrument we desire to stabilize, in any suitable manner.

In the particular example shown in the drawings, it will be noticed that the carrier is provided with three pointed posts (29) two of which are alike and the third is slightly of a different shape. This particular carrier is designed to carry a bombsight, which is provided with three receptacles which fit upon the three posts 29 singly. The two horizontal posts are adjustable in directions at right angles to each other (see Fig. 6) thus enabling us to bring the center of gravity of the bombsight system to any desired position in space. An important feature of my system of stablization is to balance every member separately so that the balance of the gyroscope shall not be affected by the addition of the separate elements.

After all the members are balanced separately, and the bombsight is placed upon the carrier (25), its center of gravity is positioned by means of the adjustable posts (29)

so as to coincide with the point of intersection of the horizontal axes X, X' and Z, Z'. When the bombsight is thus positioned upon the carrier it forms to all intents and purposes an integral system with the carrier, having two degrees of freedom, the same as the gyro casing.

I may now employ two fundamentally different systems for the stabilization and operation of the bombsight. According to the first method, the bombsight is permanently left on the carrier, and when settings are to be made on the different scales of the sight, such as for altitude, speed trial correction and other factors, the bombsight and gyroscope together are locked to the base by means of the cone-lock mechanism shown at 90, 91, 92, 93 and etc.

When the system is thus locked the axis Y, Y' may be considerably displaced from the vertical, since the instrument is now rigidly connected to the plane and hence is subject to all the fluctuations of the plane. Hence, the settings of the sight are accomplished with all possible diligence and speed and the gyro system quickly unlocked from the base by the same mechanism.

Soon after being unlocked, the gyro will find the vertical and the sight will be stabilized and ready for use. This method of operation has the advantage that when the system is locked, the instrument to be stabilized may be handled without fear of disturbing the gyro. But on the other hand when the system is unlocked, the instrument may not be touched without disturbing the stabilizer. According to the second method, the stabilizer system is always left free and unlocked during operations, but when settings are to be made on the sight, it is lifted off the carrier (25) by means of any suitable mechanism and held rigidly fastened to the base, and after settings are made the sight is replaced upon the carrier by the same mechanism.

During the entire period the gyro stabilizer is free and active and not subject to any continuous disturbing influences. Only during the removal and replacement of the sight is there any possibility of disturbances, but this can be reduced to negligible proportions since the time taken in removing and replacing the sight is extremely small.

The advantage of this indirect method of stabilization resides in the fact that the stabilizer is at all times free and undisturbed and the instrument to be stabilized is an integral part of the system at all times except when manual settings or adjustments are required, when it is separated from the system and held rigidly on the base. We thus obtain the effect of complete and continuous stabilization with the advantage of manual adjustments, without affecting the stabilizer.

The operation of the lifting mechanism will be easily understood by a glance at the drawings. The handle (30) turns the shafts (31 and 32) in the horizontal plane and the shaft (33) and (34) in the vertical plane, by means of a system of bevel gears shown at (35) and the cooperating sets of spur gears (36 and 37, 38, 39, 40, 41). The spur gears (38, 39 and 40, 41), operate doors on the side of the cover, so that upon turning the handle (30) through one quarter of a turn, the doors swing out on hinges (42) mounted on shafts (33') and (34') through one-half of a turn and thus allows the operator to insert his hand and make adjustments on settings on the bombsight. The spur gears (36, 37 and 43, 44) operate a system of levers shown at (45, 46), so that the same turn of the handle (30) which opens the side doors also serves to elevate the system of levers which in turn raise the bombsight off the carrier (25).

It will be seen from an inspection of the different views of the lever system that as the two pairs of forks (47) are elevated against rigid bars located suitably on the body of the bombsight, corresponding fingers (48) are simultaneously raised into position so as to lock the bombsight on the forks (47).

Thus in one operation of turning the handle (30), I am able to lift the bombsight off the carrier detaching it from the gyro system, lock it on the main frame and open side doors rendering the bombsight visible and accessible to the operator.

There is also a large sliding door provided on the front face of the cover, which is left open during operations so that the operator has full view of the sight and has access to it from two sides. The outline of the external cover only is shown in these drawings but the details are omitted in order not to encumber the figures unduly. But it will be understood that said cover completely encloses the gyro stabilizer and the instrument stabilized and when it is closed it makes the unit dust and water proof.

I claim—

1. A stabilizer comprising a gyroscope, an instrument carrier directly controlled by said gyroscope, an instrument seated on said carrier, and a plurality of vertical posts for supporting said instrument from beneath so that it may be lifted off the carrier without disturbing the gyroscope.

2. A stabilizer comprising a gyroscope, an instrument carrier, directly controlled by said gyroscope, an instrument seated on said carrier, means for lifting said instrument off the carrier, and means for locking said instrument in such lifted off position.

3. A stabilizer comprising a gyroscope, an instrument carrier, directly controlled by said gyroscope, an instrument seated on said carrier, means for lifting said instrument off the carrier, an enclosing casing for the gyroscope carrier and said instrument having a door and means for opening said door concurrently with the operation of lifting said instrument off the carrier.

4. A stabilizer comprising a gyroscope, an instrument carrier controlled thereby, an instrument seated on said carrier and a plurality of vertical posts for supporting said instrument from beneath so that it may be lifted off the carrier without disturbing the gyroscope, and means for adjusting one of said posts in relation to another and means for detaching said instrument from the carrier without disturbing the gyroscope.

5. A stabilizer comprising a gyroscope, an instrument carrier controlled thereby, an instrument detachably supported by said carrier, and means for detaching said instrument from the carrier without disturbing the gyroscope and simultaneously locking the instrument in its detached position.

In testimony whereof I affix my signature.

ARSENE N. LUCIAN.